May 24, 1932.   H. STELZNER   1,860,298

METHOD FOR REGENERATING THE BREATHING AIR IN CLOSED ROOMS

Filed Nov. 21, 1928

Inventor
Hermann Stelzner
Conway P Coe
By
Attorney

Patented May 24, 1932

1,860,298

UNITED STATES PATENT OFFICE

HERMANN STELZNER, OF LUBECK, GERMANY, ASSIGNOR TO OTTO HEINRICH DRAGER, OF LUBECK, GERMANY

METHOD FOR REGENERATING THE BREATHING AIR IN CLOSED ROOMS

Application filed November 21, 1928, Serial No. 320,987, and in Germany December 24, 1927.

The invention relates to a method and an apparatus for purifying or regenerating air to be inhaled within closed rooms or chambers, for instance in submarine boats, airships and aeroplanes navigating at great heights and the like by the aid of distributed caustic lye.

According to the invention the caustic lye is brought together with the breathing air to be purified while in trickling down movement preferably according to the counter current system. The lye may be caused to circulate and hereby to contact with chemicals adapted to substitute the lye consumed. For effecting the circulation of the lye the pressure of the oxygen which is employed for regenerating the air may be used.

For carrying out the invention an absorption-tower is well adapted, which at its upper end is connected with a lye reservoir by an arbitrarily controlled valve, and at its lower end with a collector vessel for the circulating lye.

In the drawings two apparatus for carrying out the invention are shown by way of example.

Figure 1:
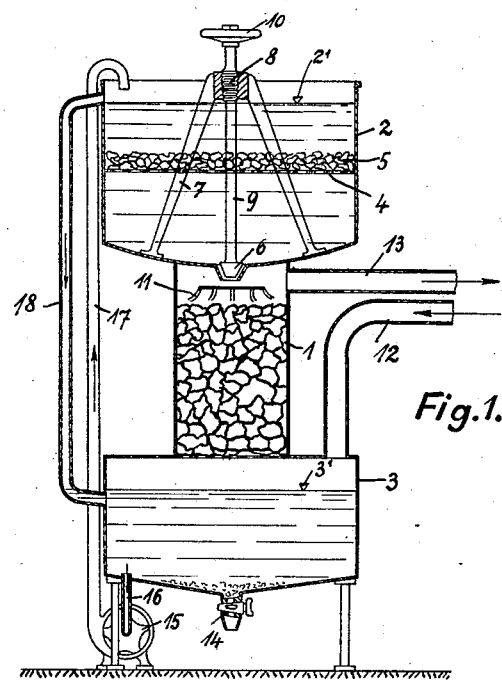
Fig. 1 is a vertical central section of an apparatus of this kind.

In the construction shown in Fig. 1 a cylindrical absorption tower 1 serves for effecting an intimate contact of the lye with the air to be purified. This tower is filled with substances inactive under process conditions, such as cylindrical sheet iron bodies (Raschigrings), granulated pumice stone or other bodies presenting a large surface. This absorption tower 1 is connected with a tank or reservoir 2 on top, and with a vessel or tank 3 at the bottom. Both tanks are partly filled with water, that is to say, up to the level 2' or 3' respectively. Below the level of water of the tank 2 a layer 5 of caustic alkali, for instance caustic soda, is placed on a perforated plate or sieve 4. By a valve 6 the communication between the tank 2 and the absorption tower 1 may be interrupted at will, the valve spindle 9 being provided with an outer thread 8 fitting to an inner thread of a bracket 7, and with a hand-wheel 10. When the valve 6 is opened the lye formed by the water passing through the chemical 5 will run down over the distributor 11 into the absorption tower and is hereby finely distributed over the large surface of the filling bodies. The absorption tower is in permanent communication with the lower tank 3. The air to be purified enters by the pipe 12, passes through the absorption tower in counter-current to the lye and escapes by the pipe 13. The substitution of oxygen may be effected in any desired manner. Within the tower 1 the carbon dioxide contained in the air passes from the air to the lye. The carbonates formed hereby settle in the shape of flakes or mire on the bottom of the tank 3 and may be drained by opening the cock 14.

By the aid of a pump 15 operated electrically or otherwise, the suction pipe 16 which branches off from the bottom of the tank 3, and the pressure pipe 17 which discharges into the upper tank 2 a continuous circulation of the liquid is maintained. The lye within the lower tank 3 being hereby partly consumed is renewed in the upper tank 2.

Since it is difficult in practice to control the amount of liquid fed by the pump, so as to balance the amount of liquid running out from the upper tank 2 by the valve 6, it is preferred to provide an overflow pipe 18, which, as will be well understood, maintains the levels of liquid within the tanks 2 and 3 at the marks 2' and 3' respectively, even if the pump 15 delivers more liquid than passes out through the valve 6. The continuous circulation of the liquid moreover has the advantage of a rapid solution of the chemical 5, and it follows that both tanks 2 and 3 are quickly filled with lye to the desired concentration.

When after some time, the length of which particularly depends on the number of persons breathing within the closed room, the lye present within the apparatus is consumed, it may be speedily substituted by a renewed start and by a new charge of chemicals, so that the apparatus is again ready for use. The replenishing of the oxygen is preferably secured from a storage of either liquid or compressed oxygen or by other means independent from the absorption device.

Figure 2:
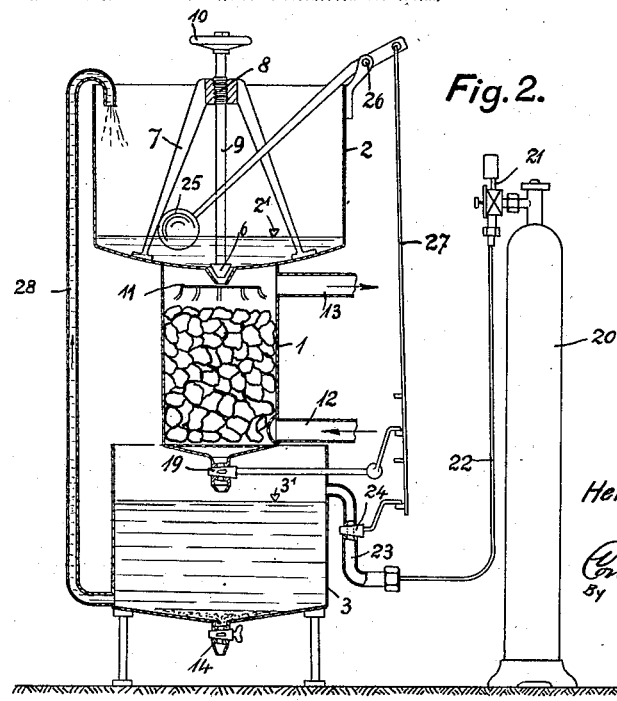
Fig. 2 is a similar view of a modification.

The construction shown in Fig. 2 differs from that shown in Fig. 1 mainly by the omission of the pump, thus rendering a consumption of energy unnecessary. In this case the lower tank 3 is at first left empty and only the upper tank 2 is filled with water and a chemical for forming a lye. The lye produced trickles into the absorption tower 1 through the valve 6 when opened by the hand wheel 10. The air enters by the pipe 12 and escapes by the pipe 13. The absorption tower 1, however, does not permanently communicate with the lower tank 3 as is the case with the construction shown in Fig. 1, but can be closed by the valve 19. An oxygen flask 20 may be connected by a pipe 22 including a pressure reducing valve 21 with the lower tank 3. The lower part 23 of the pipe 22 is expanded and provided with a valve 24.

The valves 24 and 19 are controlled by a float 25 operated by the liquid within the tank 2. The float is mounted on a two-armed lever which is pivoted at 26 and connected by a rod 27 with both the valves 24 and 19 in such manner that when the valve 24 is opened the valve 19 is closed. This operation takes place as soon as the level within the tank is lowered to the mark 2', that is to say, when the level sinks to the extent shown in Fig. 2. In this case oxygen is allowed to enter the tank 3 from the flask 20, and since the valve 19 is closed pressure is exerted within the tank 3 and the liquid is driven into the tank 2 through the pipe 28. When thus the liquid is raised within the tank 2 the float 25 will move upwardly, thereby closing the valve 24 and opening the valve 19. The oxygen within the tank 3 will thereupon by allowed to pass gradually into the stream of air and thus into the closed room in which people are breathing, corresponding to the amount of lye admitted. It is taken for granted that the amount of oxygen agrees with the amount of absorbed carbonic acid, which may be easily secured by controlling the valve 6.

I claim:—

A method for regenerating contaminated air in closed rooms, which consists in causing caustic alkali solution to flow in a trickling movement from one body of said solution to a second body of said solution, contacting a counter current of contaminated air with the trickling solution, adding oxygen to the air, and causing the alkali solution to circulate by the pressure of the added oxygen.

In testimony whereof I have signed my name to this specification.

HERMANN STELZNER.